June 19, 1962  E. FRENCH  3,039,144
TIRE REPAIR STAND

Filed May 9, 1960  2 Sheets-Sheet 1

INVENTOR.
BY ELBY FRENCH
ATTORNEY

June 19, 1962     E. FRENCH     3,039,144
TIRE REPAIR STAND
Filed May 9, 1960     2 Sheets-Sheet 2
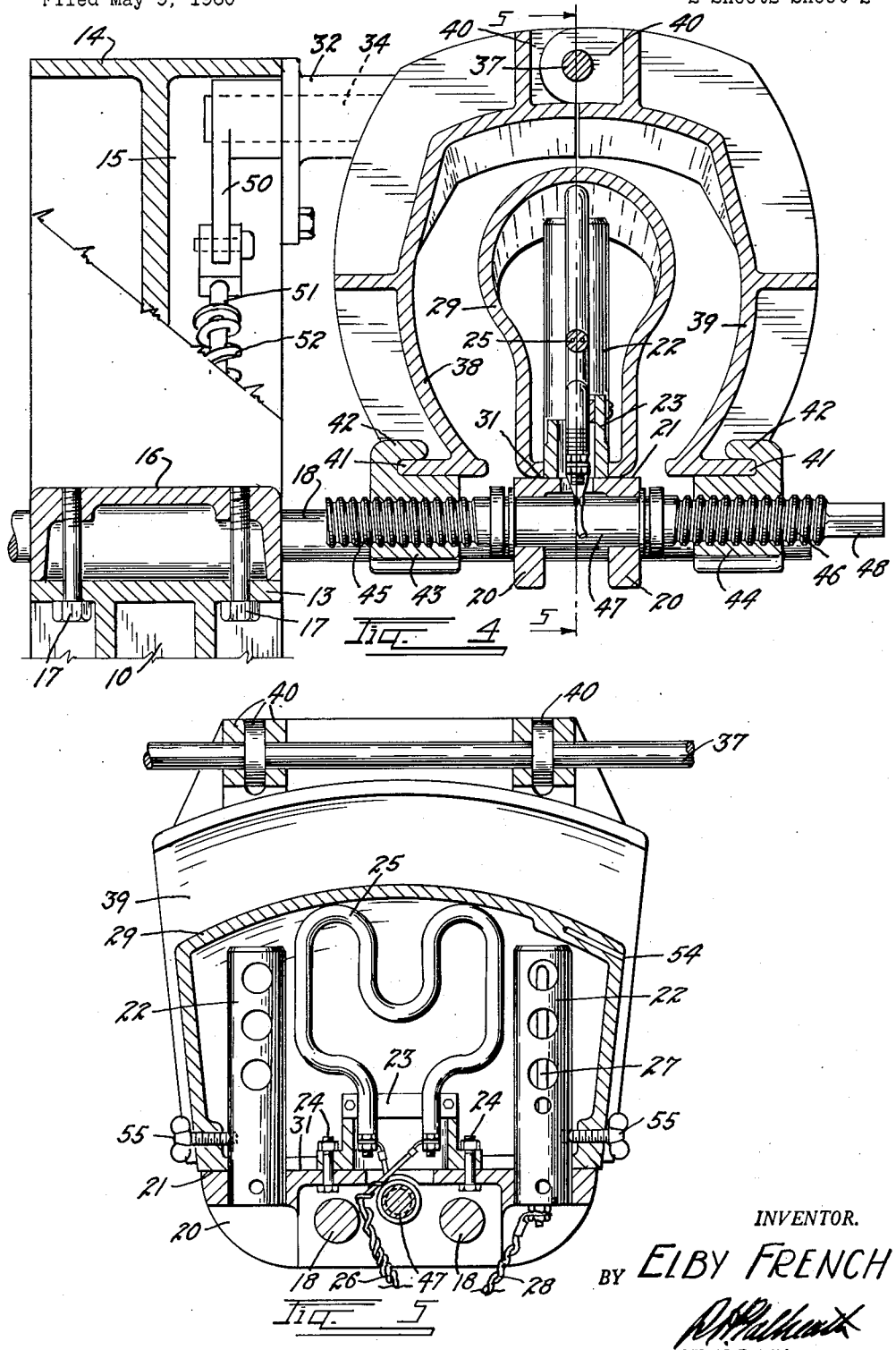
INVENTOR.
BY ELBY FRENCH
ATTORNEY

3,039,144
TIRE REPAIR STAND

Elby French, Littleton, Colo., assignor to O.K. Rubber Welders, Incorporated, Littleton, Colo., a corporation of Colorado
Filed May 9, 1960, Ser. No. 27,761
2 Claims. (Cl. 18—18)

This invention relates to a tire repair device and more particularly to a tire repair stand for use in road service stations for making spot repairs in tire casings.

The principal object of the invention is to provide a neat, compact and complete tire repair stand which will be adaptable for repairing two casings simultaneously and in which the casing molds and curing matrixes can be quickly and easily interchanged without the use of tools to quickly adapt the device to the repair of all sizes and types of casings.

Another object of the invention is to provide a matrix construction for spot repair devices in which all electrical heating elements, thermostats, and other electrical equipment will be permanent upon the device and so arranged that matrixes of different sizes, contours, etc., can be quickly and easily positioned on and removed from the electrical elements without requiring any electrical connections or the use of any tools.

A further object is to provide a hood structure or external mold structure for surrounding the exterior of a casing which can be quickly and easily released from or applied to the casing, and which, when not used, can be elevated to a supported position out of the way of the operator so as not to interfere with the placement of the casing upon the matrix.

A still further object is to provide a spot repair device in which the curing arm or matrix will be free to automatically move to a central position within the casing when the external curing hood is closed thereover and in which the curing hood will be free for manual adjustment longitudinally of the casing for proper placement over the repair.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 4 is an enlarged fragmentary cross section taken on the line 4—4, FIG. 2; and FIG. 5 is a similar fragmentary section taken on the line 5—5, FIG. 4.

Figures 1, 2, 3:
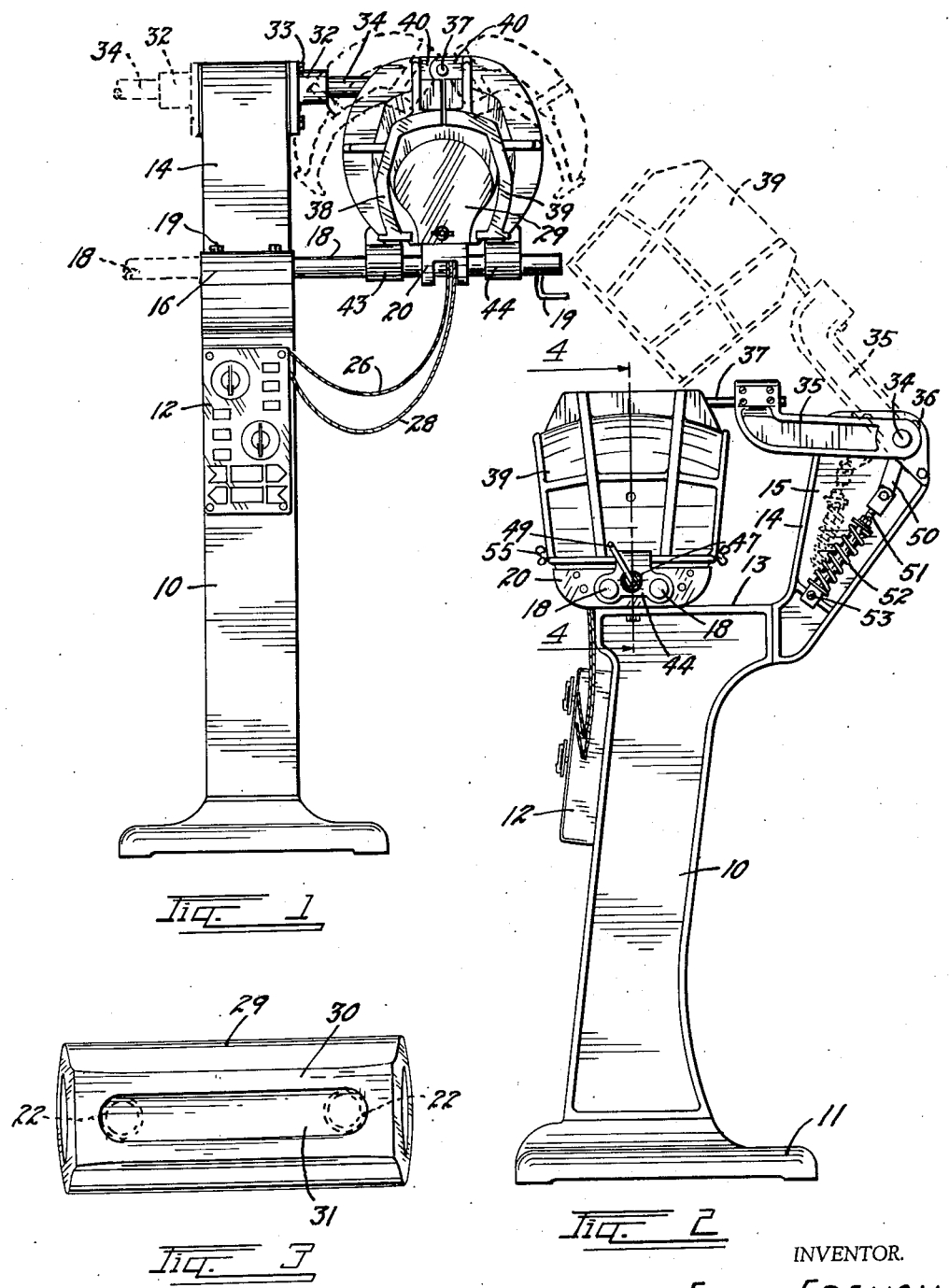
FIG. 1 is a front view of the improved tire repair stand arranged for use on a single casing.
FIG. 2 is a right side view thereof.
FIG. 3 is a detail bottom view of a matrix as employed in this invention.

The invention employs a vertical standard 10 supported from a floor engaging base casting 11 and terminating at its upper extremity in a flat top table 13. An electrical control box 12 containing the usual time switches, etc. for operating the electrical mechanism of the device is mounted upon the front face of the standard 10 and a supporting bracket 14 is secured to the standard at the rear of the table 13 and extends upwardly and rearwardly therefrom. The bracket 14 has an I-beam cross-section so as to form an indented cavity 15 in each side thereof.

A mounting block 16 is fixedly mounted on the table 13 in any desired manner, such as by means of suitable cap screws 17. The mounting block 16 is provided with two, horizontal, parallel bores through which a pair of horizontal, parallel track bars 18 are inserted and secured in any desired manner, such as by means of suitable set screws 19. For a single unit device, the track bars will project from the standard at one side only, as shown in solid line in FIG. 1 and for a double unit device, the track bars will project from both sides of the mounting block, as indicated in broken line in FIG. 1.

A matrix base 20 is slidably mounted on the two track bars 18 and is free to be moved horizontally thereon toward and away from the standard 10. The matrix base 20 has an inverted U-shaped cross section, the two depending sides of which are drilled to receive the track bars 18 and the top portion of which forms a flat matrix receiving surface 21. Two matrix guide tubes 22 are mounted in, and extend vertically upward from, the matrix receiving surface 21, there being one guide tube at each side of the pair of track bars 18, as shown in FIG. 5.

A hollow heater bracket 23 is mounted on the matrix receiving surface 21 in any desired manner, such as by means of suitable clamp screws 24, intermediate the guide tubes 22. The lower, terminal extremities of a tubular heating element 25, such as a "calrod" or the like, are secured to and extend downwardly within the hollow interior of the heater bracket 23. The heating element is convoluted into an open Y-shaped design lying in the plane of the two guide tubes 22.

An electrical conductor cord 26 extends from the terminals of the heating element to the proper terminals in the control box 12. An electrical circuit control thermostat 27 is mounted in one of the guide tubes 22 from which a second conductor cord 28 extends to the control box 12.

A hollow, arcuate, internal casing curing matrix 29 is positioned over the heating element 25. The curing matrix 29 has a contour to substantially correspond to the internal cross-section of the standard vehicle tire casing and is provided with a flat bottom 30 designed to rest upon the matrix receiving surface 21 of the matrix base 20. An elongated, arcuate-ended aperture 31 is formed through the flat bottom 30, the extremities of which are designed to slidably fit about the guide tubes 22, as indicated in broken line in FIG. 3.

The curing matrix 29 rests by gravity upon the surface 21 and is secured in place by means of suitable set screws 55 which enter receiving openings in the guide tubes 22. Thus, curing matrixes to suit various sizes of tires can be quickly and easily interchanged without the use of tools and without affecting the electrical equipment.

A flanged shaft bearing 32 is secured to the side of the bracket 14 adjacent to the top of the latter, such as by means of suitable cap screws 33. A horizontal, rotatable hinge shaft 34 is journalled in and extends through the bearing 32. The outer extremity of the hinge shaft 34 extends horizontally outward parallel to and above the plane of the track bars 18. The inner extremity of the shaft 34 extends inwardly into the indented cavity 15 of the bracket 14. A curing hood supporting arm 35 is fixedly mounted on the outwardly extending portion of the shaft 34 by means of a suitable set screw 36. A hood hinge rod 37 is adjustably mounted in and extends from the supporting arm 35 over and parallel to the curing matrix 29.

A curing hood consisting of an inner pressure case 38 and an outer pressure case 39 is hingedly mounted on the hood hinge rod 37. Each of the pressure cases is provided with upper hinge ears 40 through which the rod 37 passes so that they may be freely swung outwardly away from or inwardly toward each other about the axis of the hinge rod 37. The pressure cases may also be moved longitudinally of the rod 37 to any desired position thereon.

The lower edges of the pressure cases 38 and 39 are provided with outwardly projecting flanges 41 adapted to be engaged by hooks 42 formed on pressure nuts 43 and 44. The nuts 43 and 44 are slidably mounted on the track bars 18 and they are threaded on the extremities of a horizontal clamp screw 47 which is journalled at its middle in the downwardly extending sides of the matrix base 20 intermediate the track bars 18. The pressure nut 43 is threaded upon right hand threads 45 on the screw 47 and the pressure nut 44 is threaded upon left hand threads 46 thereon so that rotation of the screw in one direction will draw the bottoms of the pressure cases toward each other and rotation in the other direction will allow the bottoms of the pressure cases to separate from each other. The clamp screw 47 is provided at its other extremity with a crank extremity 48 for receiving a suitable hand crank 49.

The inner extremity of the hood hinge shaft 34 within the cavity 15 is provided with a spring lever 50 from which a compressible connecting rod 51 extends through a compression spring 52. The lower extremity of the compressible connecting rod is rotatably mounted on a spring pin 53 in the bracket 14. The spring lever 50 is so positioned radially of the axis of the shaft 34 that when the pressure cases 38 and 39 are in the lower solid line position of FIG. 2, the bias of the spring 52 acts to urge the cases downwardly and when the cases are elevated, out-of-service, broken line position of FIG. 2, the bias of the spring 52 is such as to resiliently maintain the cases in their elevated positions until manually pulled downward past the "dead center" position of the spring lever 50.

The repair device has been illustrated and described as a single unit for repairing a single casing at a time. If a double unit is desired, the track bars 18 are continued outwardly at the other side of the standard and a second shaft bearing 32 and a second hood hinge shaft 34 is mounted on said other side, as shown in broken line in FIG. 1 to receive a duplicate of the above described mechanism.

It is believed that the use of the device will be apparent to one skilled in the art. Briefly, the casing to be repaired is hung over the matrix 29 with the repair patch in place on the matrix. An inflatable outer curing pad of the electrically heated type is positioned over the repair and the pressure cases 38 and 39 are pulled downwardly about the casing into engagement with nuts 43 and 44. The clamp screw 47 is then rotated to press the two cases against the curing pad and casing. The curing pad is now pneumatically inflated to apply curing pressure to the repair and electric current, controlled by the thermostat 27, is applied to the matrix heater 25 and to the outer curing pad to provide the proper curing temperature. When the cure has been completed, the casing is released, by a simple reverse rotation of the clamp screw and by swinging the pressure cases upwardly, and lifted from the matrix 29.

To adapt the device for use on a different size of casing, it is only necessary to manually lift the matrix of the desired size. The pressure cases 38 and 39 can be removed by simply pulling them from the hinge rod 37 and replacing them with the cases of the desired size. No tools are required.

It will be noted that the pressure nuts 43 and 44 are drilled to receive the track bars 18 and that they are slidably guided by the latter. The internal curing matrix 29 is provided with a thermometer socket 54 into which a conventional thermometer may be inserted for checking the temperature of the matrix.

Attention is called to the fact that the matrix base 20 is horizontally slidably on the track bars 18 and the hinge bars 40 are horizontally slidably on the hood rod 37. This allows full freedom in positioning the hood over the repair and as the pressure nuts 44 are drawn toward each, allows the matrix 29 full freedom to move to a medial position between the pressure cases 38 and 39.

While a specific form of the improvement has been described and illustrated herein, it is to be understood that the same may be varied within the scope of the appended claims, without departing from the spirit of the invention.

Having thus described the invention what is claimed and desired secured by Letters Patent is:

1. An internal curing matrix structure for a tire repair device comprising: a relatively flat horizontal matrix base; vertical guide members fixed to and extending upwardly from said base; an electrical heating element fixed to and extending upwardly from said base intermediate said guide members; an electrical thermostat incorporated fixedly mounted within one of said guide members, said thermostat being in electric circuit with said heating element to control the heat of the latter; a hollow, removable, interchangeable, internal tire matrix enclosing said guide members and said heating element, said matrix having an arcuate top to conform to the interior of a tire and a relatively flat bottom resting on said base, said matrix being supported solely by said base, an elongated aperture formed in said bottom for receiving said guide members and said heating element so as to guide said matrix into position on said base about said heating element as said matrix is lowered onto said base and to limit lateral movement of said matrix on said base; and means for supporting said matrix base.

2. An internal curing matrix structure as described in claim 1 having releasable locking means on said matrix engaging said guide members for detachably locking said matrix against vertical movement away from said base.

References Cited in the file of this patent

UNITED STATES PATENTS

| | | |
|---|---|---|
| 1,630,815 | Wheelock | May 31, 1927 |
| 1,666,998 | Faber | Apr. 24, 1928 |
| 1,757,635 | Jarratt et al. | May 6, 1930 |
| 1,880,407 | Brown | Oct. 4, 1930 |
| 1,842,124 | Schmidt | Jan. 19, 1932 |
| 1,997,268 | Scharpf | Apr. 9, 1935 |
| 2,024,279 | Ebenhack | Dec. 27, 1935 |
| 2,852,810 | Gruber | Sept. 13, 1958 |
| 2,904,842 | Alm | Sept. 22, 1959 |
| 2,991,505 | Van Scoyk | July 11, 1961 |

FOREIGN PATENTS

| | | |
|---|---|---|
| 15,248 of 1928 | Australia | Aug. 23, 1929 |